Aug. 8, 1961        E. E. RUSH        2,995,009

CLOSURE FOR ROCKET CASE

Filed March 25, 1957

INVENTOR.
E.E. RUSH

BY Hudson and Young

ATTORNEYS

2,995,009
CLOSURE FOR ROCKET CASE
Elton E. Rush, McGregor, Tex., assignor to Phillips Petroleum Company, a corporation of Delaware
Filed Mar. 25, 1957, Ser. No. 648,441
3 Claims. (Cl. 60—35.6)

This invention relates to a closure means for pressure vessels. In one of its apsects it relates to an improved means for closure of a rocket motor case. In another of its aspects it relates to an improved method for closing pressure vessels.

Solid-propellant rocket motors are used as aircraft JATO units, as boosters for long-range rocket missiles and in various other applications. The rocket motor case wall thickness in large motors is often too great to allow turning the case wall over against an end plate as a closure means, as is sometimes done with small rocket motor cases. Excessive deformation of thick case walls often results in cracking of the metal with resulting loss of strength. Conventional methods for closure of rocket motors having case walls too thick for turning over against the end plate have been to use snap rings, or to insert a strip key through a slot in the rocket motor case. The strip key matches cut-away sections in the case and the closure head. While these procedures have been satisfactory, so far as a positive closure is concerned, the methods are costly and require close machining so that the snap rings or strip key will match the cut-away sections without undue friction and also without leaving an excessive void.

It is an object of this invention to provide a closure means for a pressure vessel which is economical, simple, and positive. It is also an object of this invention to provide an improved closure means for a rocket motor case. It is a further object of this invention to provide a method and means for closing a rocket motor case without the requirement for a strip key or a snap ring. The provision of a rocket motor case capable of being closed by simple crimping operation is also an object of this invention. Other objects and advantages will be apparent to one skilled in the art upon study of this disclosure and the appended drawing wherein;

Broadly, the invention relates to a means and a method for closing a pressure vessel by crimping the end of the vessel about the edge of the closure head and preferably about a ledge which projects outwardly from the edge of the closure head. A cut-away section on the inside of the case wall is provided so as substantially to coincide with the ledge on the closure head. An obturating ring seal made of rubber or other resilient material can be positioned in a recess around the periphery of the head to provide a seal between the closure head and case wall, or a sealant can be placed between the case wall and the closure head before the wall is crimped around the head. Either or both sealing means can be employed as desired. A seat can be provided inside the vessel to serve as a stop for positioning the head correctly during the crimping operation. The seat can be a continuous ring secured to the vessel wall or can be a plurality of individual stop members. The crimping can be accomplished by a press, rollers, or other convenient means. The crimping occurs at the cut-away section of the wall where the wall thickness is at a minimum.

Figure 1:
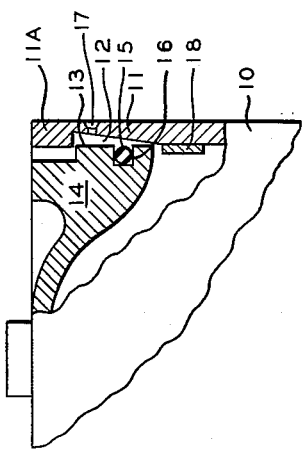
FIGURE 1 is a partially exploded view of the closure end of a rocket motor embodying the invention.

A better understanding of the invention can be obtained by referring to the drawing wherein the closure means of this invention is illustrated for closing a rocket motor case. Referring now to FIGURE 1 the closure end of a rocket motor 10 is shown in partial sectional view. Case wall 11 has a cut-away section, or groove 12 which provides a ledge 11A adapted for a locking fit with ledge 13 of closure head 14. An O-ring 15 is positioned in recess 16 in closure head 14 to provide a seal between the case head and the closure head. One or more inlets 17 are provided for injection of sealant into the annular space between the closure head and the case wall. Seat 18 is a ring secured to the case wall by spot welding to position the closure head 14 properly during the crimping operation.

Figure 2:
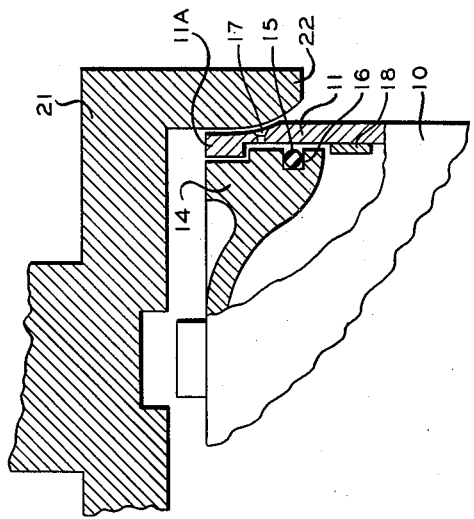
FIGURE 2 illustrates a means for making the closure.

It can be seen that the section 11A of the case wall does not have to be crimped over a great distance and therefore a positive lock can be attained with a minimum displacement of the case wall. This can conveniently be done by means of a press, such as that illustrated in FIGURE 2 wherein a press member 21 is adapted to bear down upon the open end of the rocket motor case wall and to force the end of the wall inwardly toward the closure member 14. The flared end 22 of press 21 bears downwardly upon the wall section 11A so as to press it inwardly around the entire periphery of the rocket motor case.

Figure 3:
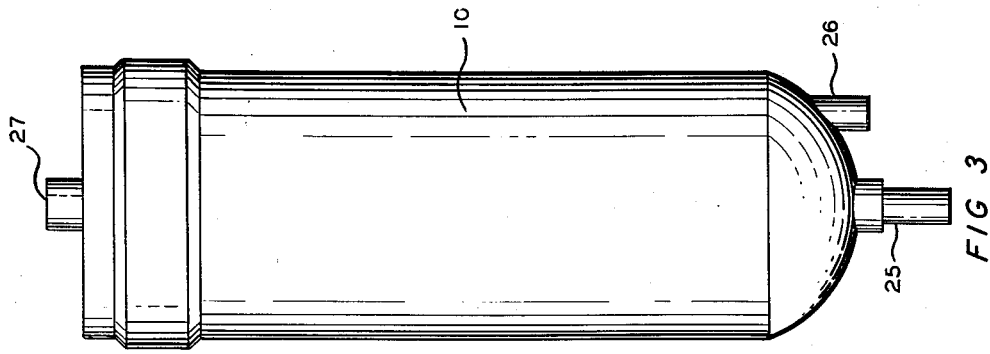
FIGURE 3 shows a complete rocket motor embodying the closure of this invention.

A completed rocket motor is illustrated in FIGURE 3 showing rocket motor case 10 with exhaust nozzle 25, safety disc 26 and igniter 27. The motor can be seated in the press at the up-set portion of the case for the closure step. The up-set of motor case 10 represents a portion of the case having a greater wall thickness at the case closure which can be used in extreme pressure vessels for increased strength if desired.

The following specific embodiment will illustrate the invention but is not to be construed as limiting the invention. A vessel is constructed having a diameter of 10 inches and a wall thickness of 0.210 of an inch, of 50,000 lb. yield strength material. A groove $\frac{1}{16}$ inch deep is cut on the inside of the vessel wall one to 1¼ inch from the open end of the vessel. The groove is beveled to meet the surface of the inside vessel wall about one inch from the deepest portion of the groove. The edge of the closure head extending beyond the groove is recessed $\frac{1}{16}$ inch. The vessel, upon closure, withstands a hydro-test of 2200 p.s.i. and has a bursting strength of 3200 to 3600 p.s.i.

The closure means of this invention can be used with any pressure vessel including liquid-propellant rockets and solid-propellant rockets. This closure means is especially adaptable for solid-propellant rockets inasmuch as the solid propellant must be loaded into the case prior to closure of the case and is therefore preferred for use with solid-propellant rockets.

Liquid propellants are known in the art and include such materials as nitric acid and aniline, separately introduced into the combustion chamber. Solid propellants include smokeless powder, cordite, and slow burning propellant compositions such as ammonium nitrate together with a rubber binder composition, for example, a composition comprising about 75 parts by weight of ammonium nitrate and about 25 parts by weight of rubbery copolymer of butadiene and methylvinylpyridine. Any rocket propellant composition known in the art can be employed in the rocket motor case of this invention.

It can be seen that this invention provides an improved means for closure of a pressure vessel such as a rocket motor case since a slight crimping of the case wall will provide a positive lock of the closure head and can be accomplished quickly and simply. This closure means does not require heat and therefore provides the safety factor over methods wherein heat is required. The closure means of this invention does not require close machining as in the case of the use of threads and strip keys in effecting a closure. The closure method and means of this invention are applicable to production line methods of manufacture. The above advantages, and others, will be apparent to those skilled in this art.

Variations and modifications are possible within the scope of the disclosure of this invention, the essence of which is the provision of a method and a means for closure of a pressure vessel wherein a positive lock is secured between the vessel wall and the closure head by a slight crimping of the end of the vessel wall so as to engage a ledge on the vessel wall with the outer edge of the closure head.

That which is claimed is:

1. For use in a rocket motor assembly apparatus comprising a rocket motor case having an annular groove on the inside of said case wall spaced from and adjacent an open end of said case; a passageway extending through the case wall at said groove; a ring secured to the inside of said case wall adjacent said groove on the side opposite the open end of said case; a closure member adapted for seating engagement with said ring and having a circumferentially recessed portion at its outer side substantially equal to the portion of the case wall which extends from said groove to the open end of said case; and a sealing material positioned between said case wall and said closure head.

2. For use in effecting closure of a rocket motor wherein a solid propellant is incorporated as the power source, apparatus comprising a rocket motor case having an annular groove on the inside of said case wall spaced from and adjacent an open end and normal to the longitudinal axis of said case; a seating means secured to the inside of said case wall adjacent said groove on the side opposite the open end of said case; a passageway extending through the case wall for injecting sealing material through the case wall into said annular groove; a closure member adapted for seating engagement with said seating means, having an annular groove around its periphery and a circumferentially recessed portion at its outer side substantially equal to the portion of the case wall which extends from said groove in said case wall to the open end of said case; a resilient ring member positioned in said groove around the periphery of said closure member for sealing engagement between said case wall and said closure head; and means for crimping said case wall which extends from said groove in said case wall to the open end of said case around said recessed portion of said closure member.

3. A rocket motor for use with a solid propellant comprising a cylindrical pressure resistant case having a closed end and an open end an an annular groove on the inside of said case wall spaced from and adjacent said open end and normal to the longitudinal axis of said case; a seating means secured to the inside of said case adjacent said groove on the side opposite the open end of said case; a closure head adapted for seating engagement with said ring so that the portion of the case wall which extends from said groove to the open end of said case extends beyond the edge of said closure head; means for injecting sealing material into said annular groove; and means for crimping said case wall which extends from said groove to the open end of said case around said edge of said closure head.

References Cited in the file of this patent

UNITED STATES PATENTS

| 1,312,517 | Carlson | Aug. 12, 1919 |
| 2,426,526 | Rutishauser et al. | Aug. 26, 1947 |
| 2,574,625 | Coss | Nov. 13, 1951 |